June 11, 1940.  R. W. P. DE VRIES  2,203,898
LUMINESCENT MATERIAL
Filed May 26, 1938
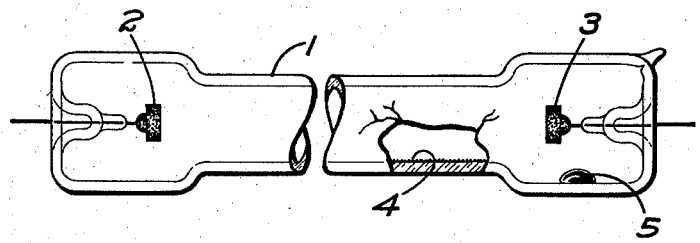
INVENTOR
Reinier Willem Petrus de Vries
BY
Harry E. Dunham
ATTORNEY Patented June 11, 1940

2,203,898

UNITED STATES PATENT OFFICE 2,203,898

LUMINESCENT MATERIAL

Reinier W. P. de Vries, Eindhoven, Netherlands, assignor to General Electric Company, a corporation of New York Application May 26, 1938, Serial No. 210,278
In Germany June 4, 1937

3 Claims. (Cl. 250—80)

The present invention relates to luminescent materials generally and more particularly the invention relates to a process for protecting such materials from harmful chemical or physical influences.

The object of the invention is to provide an enveloping or carrying material for luminescent material, such as zinc sulphide or zinc cadmium sulphide, which is inert with respect to the luminescent material at elevated temperatures. Another object of the invention is to provide a luminescent product which is readily fabricated into articles of various shapes useful in the arts generally and particularly in the advertising field. Another object of the invention is to provide a luminescent product useful in conjunction with gaseous electric discharge lamp devices to complement and supplement the light emitted by such devices. Still further objects and advantages attaching to the device and to its use and operation will be apparent to those skilled in the art from the following particular description.

I have observed that the light output of luminescent sulphides is reduced when such materials are enveloped in glass, either by introducing such materials into a molten glass mass or by mixing such materials with pulverized glass and then melting the glass, or when low melting point glasslike inorganic materials are used to coat the luminescent materials. This is particularly noticeable when the luminescent material is in contact with the enveloping substance for a protracted period at an elevated temperature. Frequently the light emitting quality of the luminescent material is totally destroyed when the mass is heated for a period of 10 minutes to a temperature such that it can be worked into a desired shape.

I have discovered that the loss of luminescence by the sulphides is due to a chemical attack thereon by the enveloping material when said materials are at elevated temperatures. I have discovered further that such an attack does not take place when the enveloping material is an inorganic salt mass consisting of a mixture of bases, such as zinc oxide and sodium oxide, and acids, such as boric oxide and phosphorous pentoxide, in which the constituents are in such proportion relative to each other that heating of the mixture to a molten temperature, at least 900° C., for at least 2 hours is required to cause the luminescence to disappear. It is necessary to avoid sedimentation and to keep the luminescent sulphide uniformly distributed in the molten mass to obtain such an estimate. The attack of the enveloping material on the luminescent material is weaker when the luminescent particles are crowded closely together in the molten mass than when said particles are separated an appreciable distance therein. It will be understood, of course, that potassium oxide ($K_2O$) is substituted for the sodium oxide ($Na_2O$), when desired, or a mixture of these materials is used, when desired.

A particular advantage of the present invention is that a luminescent mixture is produced which is capable of being worked into desired shapes at comparatively high temperature without reducing the light output of the material to an appreciable extent. This advantage results from the fact that the enveloping material of the present invention has a comparatively low melting point so that the luminescent mixture may be worked into desired shapes at comparatively low temperatures. Because of the fact that the enveloping material attacks the luminescent material very weakly if at all the two materials can be in contact with each other when the enveloping material is in a molten state for a sufficient time to accomplish the mixing of these materials and to accomplish the forming of the luminescent mixture into desired shapes without an appreciable diminution in the light emitting power of the luminescent mixture.

I have observed that in the quaternary system $ZnO$—$Na_2O$—$B_2O_3$—$P_2O_5$ a definite region exists within which the attack of the enveloping material on the luminescent material and the accompanying diminution in the light output is at a minimum. This region is limited by the fact that for certain compositions, such as those having a very high content of zinc oxide, for example, more than 60 mol percent, a disturbing crystallization occurs upon cooling of the liquid mass. Further, certain mixtures separate into their various constituents when in the molten state and generally are useless for the purposes of the present invention. Such a separation occurs in salt masses which contain little or no sodium oxide ($Na_2O$) and phosphorous pentoxide ($P_2O_5$) and which contain more than 50 mol percent of boron trioxide ($B_2O_3$).

In general separation of the constituents is undesirable when (a) The composition of at least one of the phases no longer falls within the limits of the desired region, and if this phase or phases is or are not sufficiently inert with respect to the luminescent sulphide.

(b) The separation occurs at a temperature at which the attack of the enveloping material on the luminescent material is rapid.

The region within which the composition of the salt mixture is to lie in accordance with the above conditions has inherently no sharp boundaries. I have demonstrated, however, that this region can be indicated with sufficient definiteness for practical purposes if the composition of the enveloping material complies with the following conditions:

(a) The sum of 3 times the mol percent of zinc oxide and 18 times the mol percent of sodium oxide should be greater than the sum of twice the mol percent of boron trioxide and 9 times the mol percent of phosphorous pentoxide.

(b) The sum of the mol percent of zinc oxide and 4 times the mol percent of sodium oxide should be less than the sum of twice the mol percent of boron trioxide and 4 times the mol percent of phosphorous pentoxide.

(c) 3 times the mol percent of zinc oxide should be greater than twice the mol percent of sodium oxide.

(d) The sum of the mol percent of sodium oxide and the mol percent of phosphorous pentoxide should amount to at least 2.

The luminescent mixture produced in accordance with the present invention can be worked into various shapes useful in the advertising field and in the class of luxury articles generally. Further, the luminescent mixture of the present invention is useful in conjunction with gaseous electric discharge lamp devices. Preferably when used in conjunction with such lamp devices the luminescent mixture is applied in or on the inner or outer surface of the lamp container or on the inner or outer wall of an auxiliary envelope enclosing the lamp container. For such uses the luminescent mixture may be fused on to the surface of the glass vessel in a glasslike condition. It is also possible to prepare the enveloping material suitable for use in the present invention and then to pulverize it in the well known manner and then to apply it together with particles of luminescent material on the glass wall of the vessel after which the materials are heated to the molten temperature of the enveloping material so that the envelopment of the luminescent material by the enveloping material takes place on the surface of the glass vessel.

In the drawing accompanying and forming part of this specification a gaseous electric discharge lamp device of the positive column type and incorporating the luminescent material of the present invention is shown in a side elevational, partly sectional view.

Referring to the drawing the gaseous electric discharge lamp device comprises an elongated, tubular container 1 having graphite electrodes 2 and 3 sealed therein at the ends thereof and having therein a starting gas, such as argon, at a pressure of about 1 to 10 mm. and a quantity of mercury. The inner surface of said container 1 has a coating 4 thereon of the luminescent mixture or product of the present invention which is applied thereto by the methods disclosed above or by methods now known in the art, such as by using a volatilizable binder. The coating 4 is excited by radiation from the low pressure mercury vapor discharge between said electrodes 2 and 3 and emits visible light to complement and supplement the visible light emitted by said discharge. When desired the container 1 itself consists in whole or in part of the material of the invention.

It will be understood, of course, that the device described above is only one of many types of discharge devices with which the luminescent product of the present invention may be used. A similar coating 4 is useful on the outer envelopes, for example, of vapor arc discharge lamp devices of the high pressure type having activated, thermionic electrodes, or on the tubular containers of discharge tubes of the Claude type having cold, metal electrodes. Said envelopes and said tubular containers consist in whole or in part of such luminescent material, when desired.

In the following I have disclosed in detail a few batch compositions for producing the product of the present invention and the method of producing such product.

*Example 1*

A mixture of

| | |
|---|---|
| Zinc oxide (0.55 mol ZnO) grams | 44.7 |
| Sodium carbonate (anh.) (0.11 mol $Na_2O$) grams | 11.7 |
| Boric acid ($H_3BO_3$) (0.05 mol $B_2O_3$) grams | 6.2 |
| Phosphoric acid (spec. wt. 1.68) (0.29 mol $P_2O_5$) cm³ | 40.2 | is heated in a platinum dish to a temperature of 400 to 500° C. for a period of 30 min. to 1 hour. The sintered mass which is thus obtained is comparatively free from water and carbon dioxide. This mass is then refined, as by grinding, and is melted in a platinum crucible while being stirred with a platinum wire and is maintained at a temperature of about 1100° C. for about 30 min. after which it is poured out onto a cold steel plate. After cooling, the glasslike solidified mass is ground in a steel mortar until it is of such fineness that it passes through a sieve of 10 meshes per cm. The powder thus obtained is mixed with 5 grams of a green luminescent zinc sulphide. This mixture is then heated to about 900° C. for about 5 to 10 min. and is then poured out onto a cold plate. The glasslike, solidified product thus produced has a coefficient of linear expansion of about $95 \times 10^{-7}$ has a softening temperature of about 400° C. and emits a green colored light when irradiated with ultra violet light. Upon repeated heating, crystallization occurs which, however, does not cause a diminution of the light output. The luminescent power of the mixture disappears only when it is heated to a temperature of at least 900° C. for at least 2 hours in a porcelain crucible while being stirred with a platinum wire.

*Example 2*

A mixture of

| | |
|---|---|
| Zinc oxide (0.17 mol ZnO) grams | 13.8 |
| Sodium carbonate (anh.) (0.15 mol $Na_2O$) grams | 15.9 |
| Boric acid ($H_3BO_3$) (0.68 mol $B_2O_3$) do | 84.1 | is formed first into a sintered mass, then into a glasslike solidified mass and then into a powder as in the method disclosed in Example 1. The powder thus obtained is then mixed with about 4 grams of an orange-red luminescing zinc-cadmium sulphide containing about 35 mol percent of cadmium sulphide. This mixture is then subjected to the same process as the similar mixture of Example 1.

The glasslike solidified product thus produced has a coefficient of linear expansion of about $80 \times 10^{-7}$ has a softening temperature of about 400° C. and emits an orange-red colored light when irradiated by ultra violet light. This material, like the material of Example 1, crystallizes upon repeated heating which, however, does not cause a diminution of the light output thereof. The luminescing power of the material disappears when the product is heated to a temperature of about 950° C. for about 3 hours while being stirred.

*Example 3*

A mixture of

Zinc oxide (0.40 mol ZnO) _____grams\_\_ 32.6
Sodium carbonate (anh.) (0.05 mol Na$_2$O) _____grams\_\_ 5.3
Boric acid (H$_3$BO$_3$) (0.55 mol B$_2$O$_3$) \_\_do\_\_\_\_ 68.0 is subjected to the same process as in the Examples 1 and 2 and the powder thus obtained is mixed with 4 grams of an orange luminescing zinc-cadmium sulphide material containing about 20 mol percent of cadmium sulphide. This mixture is then heated to a temperature of about 1000° C. for a period of time comparable to the period of time during which the similar mixtures of Examples 1 and 2 are heated and the other steps in the method of producing the product of Examples 1 and 2 are then carried out. The luminescent product thus produced crystallizes more readily than that of the product of Example 2. Crystallization occurs at temperatures of about 900° C. but does not harm the luminescent power of the product. In order to cause the luminescence of the product to disappear it is necessary to heat the product to a temperature of at least 1000° C. for a period of 1½ to 2 hours.

*Example 4*

A mixture of

Zinc oxide (0.65 mol ZnO) _____grams\_\_ 52.9
Boric acid (H$_3$BO$_3$) (0.25 mol B$_2$O$_3$) \_\_do\_\_\_\_ 30.9
Phosphoric acid (spec. wt. 1.68) (0.10 mol P$_2$O$_5$) _____cm$^3$\_\_ 13.9 is subjected to the process of Example 1 and the powder thus obtained is mixed with 4 grams of a phosphorescent zinc sulphide material which emits green colored light. This mixture is subjected to the other steps of the process of Example 1 and a glasslike, sulphide, green-luminescing product having a coefficient of linear expansion of about $55 \times 10^{-7}$ and a softening temperature of about 450° C. is produced. Heating for about 3 hours at a temperature of 900° C. is necessary to cause the luminescence of this product to disappear.

*Example 5*

A mixture of

Zinc oxide (0.35 mol ZnO) _____grams\_\_ 28.5
Sodium carbonate (anh.) (0.25 mol Na$_2$O) _____grams\_\_ 26.5
Phosphoric acid (spec. wt. 1.68) (0.40 mol P$_2$O$_5$) _____cm$^3$\_\_ 55.4 is subjected to the process given in Example 1 but in this instance the fusion of the ingredients takes place in a crucible of glazed Berlin porcelain. The powder thus obtained is mixed with 5 grams of luminescing zinc cadmium sulphide containing about 20 mol percent of cadmium sulphide. This mixture is then subjected to the other steps of the process of Example 1. The glasslike, solidified, orange-luminescing product thus produced has a coefficient of linear expansion of about $150 \times 10^{-7}$ and a softening temperature of about 300° C. The luminescence of this product disappears only when it is heated to a temperature of about 900° C. for 2½ hours while being stirred with a quartz rod. While I prefer to use sodium carbonate for one of the constituents of the batches given in the above examples, this material is replaced by potassium carbonate or a mixture of sodium carbonate and potassium carbonate, when desired.

In the above examples of products made in accordance with the present invention and embodying the present invention the intensity of the luminescence, that is the light output of the material, can be varied as desired by varying the amount of the zinc sulphide material or the zinc-cadmium sulphide in the material.

What I claim as new and desire to secure by Letters Patent of the United States, is:

1. A luminescent product resistant to high temperatures and workable into articles of desired shape containing luminescent material and an inorganic salt mass enveloping said material, said salt mass containing a mixture of acids and bases the basic component of said mass being a material from the group consisting of zinc oxide and sodium oxide, the acid component of said mass consisting of a material from the group consisting of boric oxide or phosphorous pentoxide, the constituents of said salt mass being in such proportion relative to each other that:

(a) The sum of three times the mol percentage of zinc oxide and eighteen times the mol percentage of sodium oxide is greater than the sum of twice the mol percentage of boron trioxide and nine times the mol percentage of phosphorous pentoxide;

(b) The sum of the mol percentage of zinc oxide and four times the mol percentage of sodium oxide is smaller than the sum of twice the mol percentage of boron tri-oxide and four times the mol percentage of phosphorous pentoxide;

(c) Three times the mol percentage of zinc oxide is greater than twice the mol percentage of sodium oxide;

(d) The sum of the mol percentage of sodium oxide and the mol percentage of phosphorous pentoxide amounts to at least 2.

2. The method of producing a luminescent product which consists of the steps of mixing a batch composition consisting of materials of the group consisting of zinc oxide, sodium carbonate, boric acid and phosphoric acid, heating said batch to the temperature of 400 to 500° C. for 30 minutes to 1 hour to drive off the water and carbon dioxide, grinding the sintered mass thus produced, heating the powder thus obtained to a temperature of about 1100° C. for about 30 minutes in a crucible while stirring the mass, then pouring the material thus produced onto a cold plate to cool said material, grinding said material to a powder of such fineness that the particles thereof pass through a sieve of 10 meshes per cm., mixing said powder with a luminescent material, heating said mixture to a temperature of about 900° C. for about 5 to 10 minutes and then pouring the luminescent product onto a cold plate to cool said product.

3. A glass support and a luminescent coating on said support, said luminescent coating containing luminescent material and an inorganic salt mass enveloping said material, said salt mass containing a mixture of acids and bases the basic component of said mass being a material from the group consisting of zinc oxide and sodium oxide, the acid component of said mass consisting of a material from the group consisting of boric oxide or phosphorous pentoxide, the constituents of said salt mass being in such proportion relative to each other that:

(a) The sum of three times the mol percentage of zinc oxide and eighteen times the mol percentage of sodium oxide is greater than the sum of twice the mol percentage of boron trioxide and nine times the mol percentage of phosphorous pentoxide;

(b) The sum of the mol percentage of zinc oxide and four times the mol percentage of sodium oxide is smaller than the sum of twice the mol percentage of boron tri-oxide and four times the mol percentage of phosphorous pentoxide;

(c) Three times the mol percentage of zinc oxide is greater than twice the mol percentage of sodium oxide;

(d) The sum of the mol percentage of sodium oxide and the mol percentage of phosphorous pentoxide amounts to at least 2.

REINIER W. P. DE VRIES.